United States Patent
Boyer et al.

(10) Patent No.: US 9,725,003 B2
(45) Date of Patent: Aug. 8, 2017

(54) WIRELESS BATTERY CHARGING SYSTEM VARYING MAGNETIC FIELD FREQUENCY TO MAINTAIN A DESIRED VOLTAGE-CURRENT PHASE RELATIONSHIP

(71) Applicant: DELPHI TECHNOLOGIES, INC., Troy, MI (US)

(72) Inventors: Richard J. Boyer, Mantua, OH (US); Brian D. Pasha, Cortland, OH (US); John Victor Fuzo, Cortland, OH (US)

(73) Assignee: Delphi Technologies, Inc., Troy, MI (US)

( * ) Notice: Subject to any disclaimer, the term of this patent is extended or adjusted under 35 U.S.C. 154(b) by 196 days.

(21) Appl. No.: 14/708,526

(22) Filed: May 11, 2015

(65) Prior Publication Data
US 2015/0239356 A1    Aug. 27, 2015

Related U.S. Application Data

(63) Continuation-in-part of application No. 13/564,754, filed on Aug. 2, 2012, now abandoned.
(Continued)

(51) Int. Cl.
*H02J 7/00* (2006.01)
*B60L 11/18* (2006.01)
(Continued)

(52) U.S. Cl.
CPC ......... *B60L 11/182* (2013.01); *B60L 11/1816* (2013.01); *B60L 11/1877* (2013.01);
(Continued)

(58) Field of Classification Search
CPC  B60L 11/1816; B60L 11/182; B60L 11/1877; B60L 2210/30; B60L 2210/40;
(Continued)

(56) References Cited

U.S. PATENT DOCUMENTS

| 6,144,139 A | 11/2000 | Noma et al. |
| 6,198,244 B1 | 3/2001 | Hayden et al. |

(Continued)

FOREIGN PATENT DOCUMENTS

| CN | 102082469 A | 6/2011 |
| JP | 06-189403 A | 7/1994 |

(Continued)

*Primary Examiner* — Vuthe Siek
(74) *Attorney, Agent, or Firm* — Robert J. Myers

(57) ABSTRACT

An electrical charging system configured to wirelessly charge an energy storage device, such as a battery. The charging system includes an off-transducer in electrical communication with an alternating power source and electromagnetically coupled to an on-vehicle transducer connected to the energy storage device. A controller adjusts a variable frequency oscillator within the power transmitter, thereby changing the frequency of the sourced electrical power. The charging system further includes a phase detection circuit in communication with the controller and the off-transducer and configured to determine a phase difference between the alternating voltage and the alternating current supplied by the power source. The controller is configured to adjust the variable frequency oscillator based on the phase difference such that the frequency of the sourced electrical power maintains the phase difference within a desired range.

10 Claims, 4 Drawing Sheets

Related U.S. Application Data

(60) Provisional application No. 61/515,865, filed on Aug. 6, 2011.

(51) Int. Cl.
*H02J 5/00* (2016.01)
*H02J 7/02* (2016.01)

(52) U.S. Cl.
CPC .............. *H02J 5/005* (2013.01); *H02J 7/025* (2013.01); *B60L 2210/30* (2013.01); *B60L 2210/40* (2013.01); *B60L 2240/36* (2013.01); *Y02T 10/705* (2013.01); *Y02T 10/7005* (2013.01); *Y02T 10/7072* (2013.01); *Y02T 10/7241* (2013.01); *Y02T 90/122* (2013.01); *Y02T 90/127* (2013.01); *Y02T 90/14* (2013.01); *Y02T 90/16* (2013.01)

(58) Field of Classification Search
CPC ....... B60L 2240/36; H02J 5/005; H02J 7/025; Y02T 10/7005; Y02T 10/705; Y02T 10/7072; Y02T 10/7241; Y02T 90/122; Y02T 90/127
See application file for complete search history.

(56) References Cited

U.S. PATENT DOCUMENTS

| | | |
|---|---|---|
| 6,934,167 B2 | 8/2005 | Jang et al. |
| 7,211,986 B1 | 5/2007 | Flowerdew et al. |
| 7,906,997 B2 | 3/2011 | Paull |
| 8,022,775 B2 | 9/2011 | Julstrom et al. |
| 8,035,255 B2 | 10/2011 | Kurs et al. |
| 8,729,735 B2 | 5/2014 | Urano |
| 2001/0054944 A1 | 12/2001 | Sakamoto et al. |
| 2009/0189458 A1 | 7/2009 | Kawasaki |
| 2010/0181845 A1 | 7/2010 | Fiorello et al. |
| 2010/0237720 A1 | 9/2010 | Taylor |
| 2010/0244577 A1 | 9/2010 | Shimokawa |
| 2011/0084654 A1 | 4/2011 | Julstrom et al. |
| 2011/0156640 A1 | 6/2011 | Moshfeghi |
| 2011/0163542 A1 | 7/2011 | Farkas |
| 2011/0184842 A1 | 7/2011 | Melen |
| 2012/0043825 A1 | 2/2012 | Urano |
| 2012/0286726 A1 | 11/2012 | Kim et al. |
| 2013/0088194 A1* | 4/2013 | Hunter .................. B60L 11/182 320/108 |
| 2013/0313893 A1 | 11/2013 | Ichikawa |
| 2015/0008751 A1* | 1/2015 | Widmer .................. H01F 38/14 307/104 |
| 2015/0061578 A1* | 3/2015 | Keeling .................. H02J 50/80 320/108 |
| 2015/0270739 A1* | 9/2015 | Keeling ................ B60L 11/182 320/108 |
| 2016/0043562 A1* | 2/2016 | Lisi ........................ H02J 50/12 307/104 |

FOREIGN PATENT DOCUMENTS

| | | |
|---|---|---|
| JP | 2010-183812 A | 8/2010 |
| JP | 2010-268665 A | 11/2010 |
| WO | 2010036980 A1 | 4/2010 |
| WO | 2012-111085 A1 | 8/2012 |

* cited by examiner

WIRELESS BATTERY CHARGING SYSTEM VARYING MAGNETIC FIELD FREQUENCY TO MAINTAIN A DESIRED VOLTAGE-CURRENT PHASE RELATIONSHIP

CROSS-REFERENCE TO RELATED APPLICATION

This application is a continuation-in-part application and claims benefit under 35 U.S.C. §120 of U.S. patent application Ser. No. 13/564,754, filed Aug. 2, 2012, which claims priority under 35 U.S.C. §119(e) of U.S. Provisional Patent Application No. 61/515,865, filed 6 Aug. 2011, the entire disclosure of each of which are hereby incorporated herein by reference.

TECHNICAL FIELD OF THE INVENTION

This invention relates to a charging system used to wirelessly charge a battery of a vehicle, more particularly, to a wireless battery charging system configured to vary the magnetic field frequency to maintain a desired voltage-current phase relationship.

BACKGROUND OF THE INVENTION

Wireless charging systems having an off-transducer and on-vehicle transducer that are magnetically coupled and transfer electrical energy wirelessly across a physical gap are well known. Due to the various loading, tolerances of components, temperature, the resonant frequency for optimal magnetic coupling between off-transducer and on-vehicle transducer the can vary. To maintain the highest level of efficiency there needs to be a way to operate the charging system to maintain optimal magnetic coupling of the system. In addition, interoperability of the wireless charging system with on-vehicle transducers built by different vendors that have different resonant frequencies need to be addressed to that each vendor's on-vehicle transducer does not need to be used only with that vendor's wireless charging system.

BRIEF SUMMARY OF THE INVENTION

According to an embodiment of the invention, an electrical charging system is provided. The electrical charging system is configured to wirelessly charge an energy storage device. The electrical charging system includes an electrical power transmitter including a variable frequency oscillator configured to source electrical power having an alternating current, an alternating voltage, and a frequency, a controller operable to adjust the variable frequency oscillator, thereby changing the frequency of the sourced electrical power, an off-transducer in electrical communication with the electrical power transmitter, configured to be electromagnetically coupled to an on-vehicle transducer that is in electrical communication with the energy storage device, thereby inducing the on-vehicle transducer to capture electrical power to charge the energy storage device, and a phase detection circuit in communication with the controller and the off-transducer and configured to determine a phase difference between the alternating voltage and the alternating current. The controller is configured to adjust the variable frequency oscillator based on the phase difference such that the frequency of the sourced electrical power maintains the phase difference within a desired range.

The controller may be configured to adjust the variable frequency oscillator such that the frequency of the sourced electrical power sweeps within a frequency range of 10 kilohertz (kHz) to 450 kHz.

The electrical charging system may further include a wireless transmitter in electrical communication with the controller. In this case, the on-vehicle transducer is in electrical communication with a power detection circuit configured to determine a value of the captured electrical power. The power detection circuit is in electrical communication with a wireless receiver that is configured to wirelessly transmit the value of the captured electrical power to the controller via the wireless transmitter, and wherein the controller is configured to determine a power efficiency by comparing the value of the captured electrical power to the value of the sourced electrical power. The controller is configured to adjust the variable frequency oscillator based on the power efficiency such that the frequency of the sourced electrical power maximizes the power efficiency.

The on-vehicle transducer and the energy storage device may be disposed within a vehicle. The off-transducer and the electrical power transmitter may be disposed external to the vehicle. Alternatively, the off-transducer and the electrical power transmitter may be disposed within the vehicle.

According to another embodiment of the invention, an electrical charging system is provided. The electrical charging system configured to wirelessly charge an energy storage device. The electrical charging system includes an electrical power transmitter including a variable frequency oscillator configured to source electrical power having an alternating current, an alternating voltage, and a frequency, a controller operable to adjust the variable frequency oscillator, thereby changing the frequency of the sourced electrical power, an off-transducer in electrical communication with the electrical power transmitter, configured to be electromagnetically coupled to an on-vehicle transducer that is in electrical communication with said energy storage device, thereby inducing the on-vehicle transducer to capture electrical power to charge the energy storage device, and a wireless transmitter in electrical communication with the controller. The on-vehicle transducer is in electrical communication with a power detection circuit configured to determine a value of the captured electrical power. The power detection circuit is in electrical communication with a wireless receiver configured to wirelessly transmit the value of the captured electrical power to the controller via the wireless transmitter. The controller is configured to determine a power efficiency by comparing the value of the captured electrical power to the value of the sourced electrical power. The controller is configured to adjust the variable frequency oscillator based on the power efficiency such that the frequency of the sourced electrical power maximizes the power efficiency.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE SEVERAL VIEWS OF THE DRAWING

This invention will be further described with reference to the accompanying drawings in which.

DETAILED DESCRIPTION OF THE INVENTION

A resonant frequency of a wireless electrical charging system may vary due to variation in loading, variation electrical component performance due to tolerance stack-ups, variation in temperature, variation in component placement and orientation. A mismatch in resonant frequency may also result if an off-transducer is frequency-tuned for one particular on-vehicle transducer and then used with a different on-vehicle transducer that is not tuned to the same frequency or range of frequencies. These kinds of variation may undesirably reduce power transfer efficiency of the wireless charging system. It has been discovered that the power transfer efficiency may be effectively managed and controlled in relation to the aforementioned variations by adjusting the output frequency of the off-transducer.

The output frequency of the power transmitter that supplies electrical power to the off-transducer is determined by a variable frequency oscillator (VFO) circuit disposed in the power transmitter. The VFO circuit in the charging system advantageously provides for the adjustment of the frequency of the magnetic energy produced by the off-transducer to more closely match the resonant frequency of the on-vehicle transducer. The VFO circuit advantageously allows the resonant frequency of the off- and on-vehicle transducers to be adjusted to accommodate manufacturing tolerances, environmental conditions, and misalignment of the off- and on-vehicle transducers. The VFO circuit also accommodates differences in the resonant frequency between off- and on-vehicle transducers built by different manufactures to different specifications.

Figure 1:
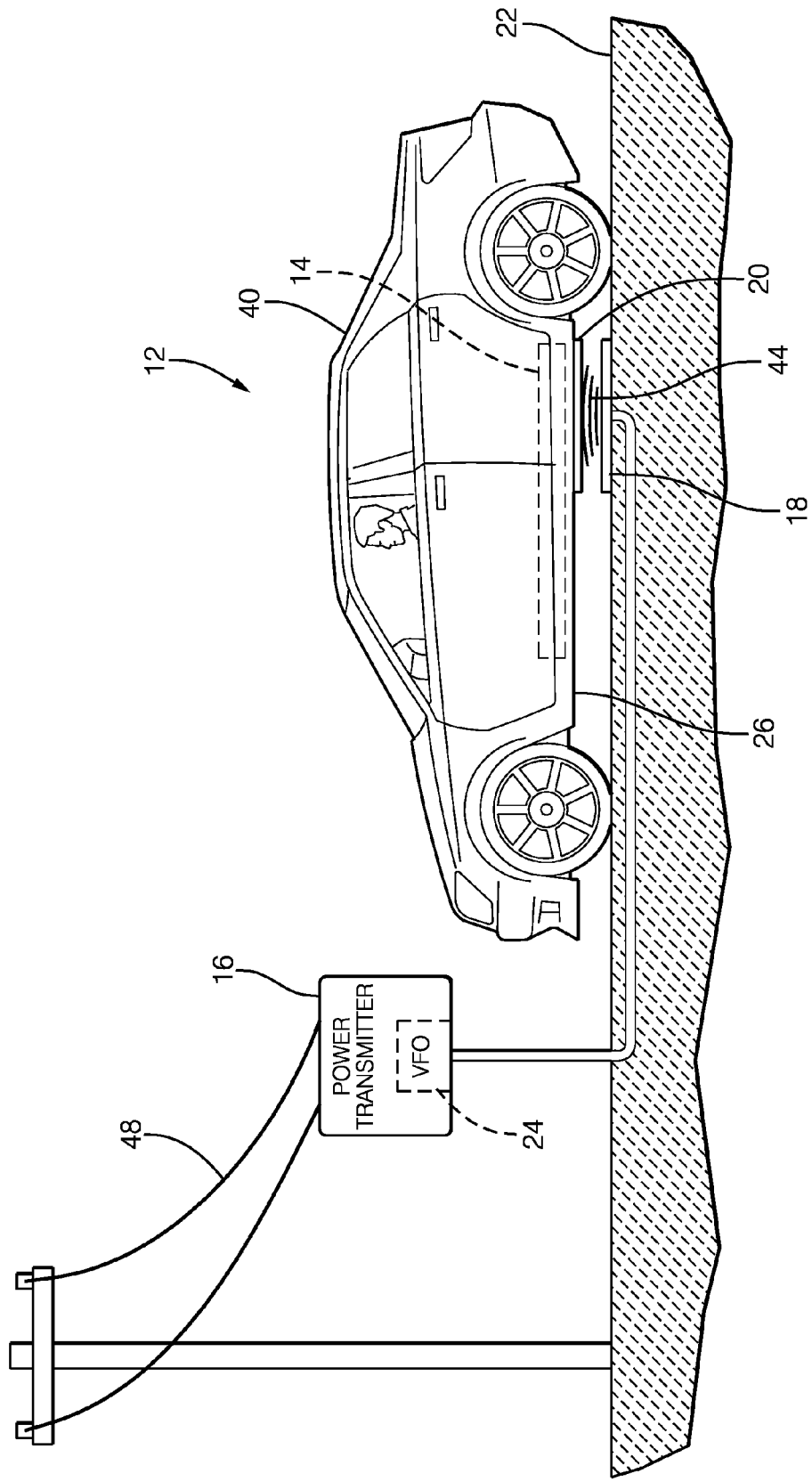
FIG. 1 is a pictorial side view of an electrical charging system that includes a variable frequency oscillator (VFO) circuit in accordance with the invention.
Figure 2:
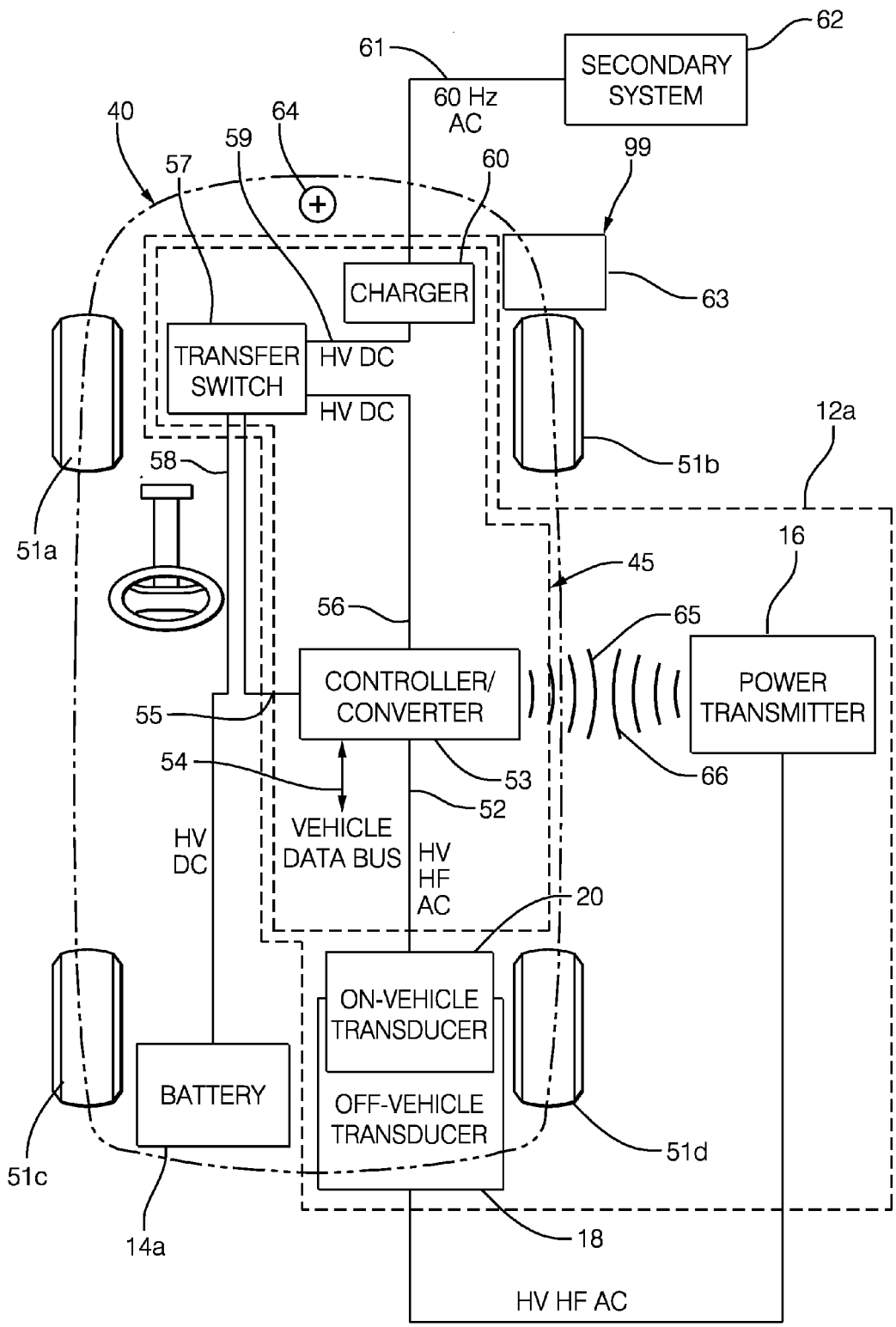
FIG. 2 is a schematic diagram of the charging system of FIG. 1 disposed intermediate the battery and the on-vehicle transducer.

A non-limiting example of a wireless charging system 12 embodying the features of this invention is shown in FIGS. 1 and 2. The wireless charging system 12 is presented here is configured to electrically charge a battery 14 that is disposed within a vehicle 40. The vehicle 40 may be a hybrid vehicle or a hybrid electric vehicle and the battery 14 may be configured to drive the vehicle's propulsion system (not shown). The wireless charging system 12 includes an alternating power transmitter 16, an off-transducer 18, and an on-vehicle transducer 20. The power transmitter 16 further includes a variable frequency oscillator (VFO) circuit 24. The power transmitter 16 is disposed external to vehicle 40. The off-transducer 18 is in electrical communication with VFO circuit 24. Preferably, the off-transducer 18 is configured to be secured to a ground surface 22, such as a garage floor or parking lot surface. The on-vehicle transducer 20 is attached to vehicle 40. The on-vehicle transducer 20 may be located on the undercarriage 26 of the vehicle 14.

The off-transducer 18 contains a source coil (not shown) that, when excited with electrical energy having an alternating voltage and alternating current supplied by power transmitter 16, generates a magnetic field that wirelessly transmits magnetic energy 44 to the on-vehicle transducer 20. For electrical charging of battery 14, the on-vehicle transducer 20 is spaced apart from off-transducer 18, thus separating the off-transducer 18 by a distance from the on-vehicle transducer 20. The alternating magnetic field generated by the off-transducer 18 induces an alternating electrical current having an alternating voltage in a capture coil (not shown). This captured electrical energy is used to charge the battery 14 of the vehicle 14.

The efficiency of energy transmission of energy between off-transducer 18 and on-vehicle transducer 20 depends on the alignment of these transducers 18, 20 so that energy may be wirelessly transferred therebetween. Such an alignment of the transducers 18, 20 may be realized when at least a portion of on-vehicle transducer 20 overlies off-transducer 18. Referring to FIG. 2, at least a portion of on-vehicle transducer 20 overlies off-transducer 18. Alternatively, the on-vehicle transducer 20 may not overlie the off-transducer 18, yet still be proximate the on-vehicle transducer 20 so that wireless energy transmission occurs.

The power transmitter 16 is in electrical communication with power source 48. The power source 48 may supply voltage of 120 VAC or 240 VAC that is generally associated with a utility main. The voltage of the power source 48 may typically have an alternating frequency of 60 Hertz (Hz) or 50 Hz, depending the utility standard for the particular geographic location. Alternatively, the power source 48 may have an operating voltage that differs from 120 VAC or 240 VAC or an operating frequency that differs from 50 Hz or 60 Hz.

The wireless charging system 12 further includes a controller/convertor 53 disposed within the vehicle 40 and cooperate with the power transmitter 16, off-transducer 18, and on-vehicle transducer 20 to provide electrical current that is useful to electrically charge battery 14. The convertor portion of the controller/convertor 53 comprises electrical components that form a rectifier circuit (not shown). The rectifier circuit is in electrical communication with on-vehicle transducer 20 to convert the HV HF AC signal output by the on-vehicle transducer 20 to a HV DC signal that is more effective to electrically charge the battery 14. As used herein, the HV HF AC signal is a high voltage, high frequency alternating current (AC) electrical signal generated by the VFO circuit 24 and input to the off-transducer 18 and output from the on-vehicle transducer 20 due to the magnetic coupling between the off- and on-vehicle transducers 18, 20. In the illustrated example, the voltage of the HV HF AC signal is greater than 120 VAC and the frequency of the HV HF AC signal is greater than 60 Hertz (Hz). The frequency may be in a range of 10 kHz to 450 kHz. For example, this range may cover frequencies typically used for closely coupled resonators that generally is in a range from 10-70 kHz and frequencies typically used for loosely coupled resonators that generally is in a range from 50-450 kHz. Also as used herein, the HV DC signal is a high voltage, direct current (DC) electrical signal wherein the voltage and current are not time varying.

The controller portion of the controller/convertor 53 includes a central processing unit (not shown) that may be a microprocessor, application specific integrated circuit (ASIC), or built from discrete logic and timing circuits (not shown). Software instructions that program the controller portion may be stored in a non-volatile (NV) memory device (not shown). The NV memory device may be contained within the microprocessor or ASIC or it may be a separate device. Non-limiting examples of the types of NV memory that may be used include electrically erasable programmable read only memory (EEPROM), masked read only memory (ROM), and flash memory. The controller portion also includes a wired transceiver (not shown), such as a controller area network (CAN) transceiver, to allow the controller portion to establish electrical communication with other devices within the vehicle 40.

As illustrated in FIG. 2 the charging system 12 further includes a transmitter (not shown) disposed in the controller/convertor 53 and a receiver (now shown) disposed within the power transmitter 16 that establish a wireless link 65 from the controller/convertor 53 to the power transmitter 16. The transmitter and receiver may be configured as transceivers in order to establish a return wireless link 66 from the power transmitter 16 to the controller/convertor 53.

The controller portion measures voltage, current, and power. The controller portion of controller/convertor 53 transmits the measured voltage, current, and power data via the wireless link 65 to the power transmitter 16 such that power transmitter 16 may further regulate the amount of power supplied to off-transducer 18 to ensure optimum charging system power efficiency. Preferably, optimum charging system power efficiency is greater than 85%. Likewise, the power transmitter 16 may further wirelessly transmit supplied power data to the controller portion of the controller/convertor 53 via the return wireless link 66. The instant controller/configuration previously describe herein along with other configurations are further described in U. S. Patent Application Publication 2013/0015812 entitled "ELECTRICAL CHARGING SYSTEM HAVING ENERGY COUPLING ARRANGEMENT FOR WIRELESS ENERGY TRANSMISSION THEREBETWEEN, which is incorporated by reference herein in its entirety.

Figure 3:
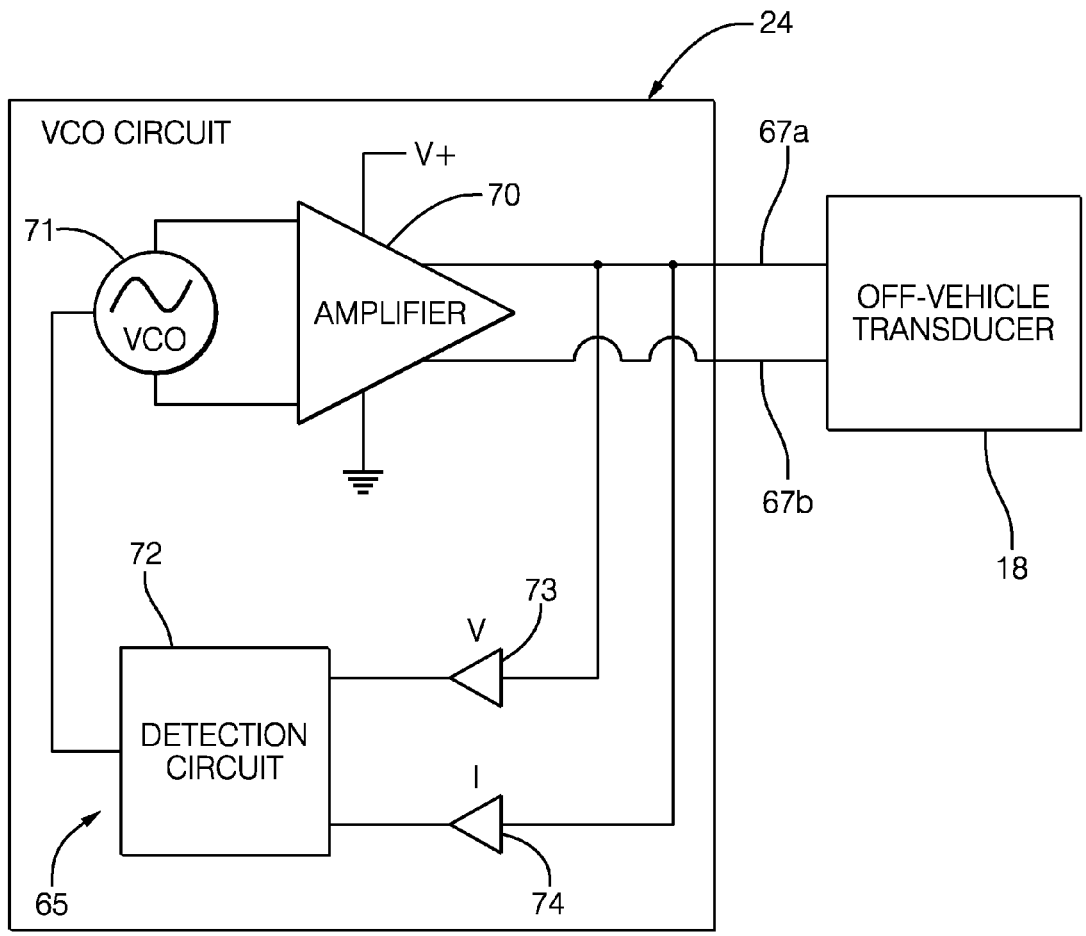
FIG. 3 shows a schematic diagram of the VFO circuit of FIG. 1.

Referring now to FIG. 3, a block diagram of the VFO circuit 24 is shown. The VFO circuit 24 includes a voltage controlled oscillator (VCO) 71, an amplifier 70, a voltage monitor circuit 73, a current monitor circuit 74, and a phase detection circuit 72. The VCO 71 is in electrical communication with the input of amplifier 70. A feedback loop is provided intermediate off-transducer 18 and the VCO 71. The feedback loop includes the voltage monitor circuit 73 and the current monitor circuit 74 in electrical communication with the phase detection circuit 72. The voltage monitor circuit 73 measures the voltage input to off-transducer 18 and the current monitor circuit 74 measures the electrical current flow input to off-transducer 18. The phase detection circuit 72 is configured to measure the phase difference between the voltage and the current at the input to off-transducer 18. The phase detection circuit 72 is electrically coupled with the VCO 71 which controls the frequency of the current supplied to output 67*a*.

The phase detection circuit 72 is configured to determine if the voltage and current are within a predetermined phase difference range. If the phase difference is not within the desired range, the voltage output of the phase detection circuit 72 varies, thus increasing or decreasing the frequency of the VCO 71 and thus the frequency of the VFO circuit 24 until the phase difference falls within the desired range. Monitoring of output voltage and current is done continuously during the operation of the charging system 12 and frequency adjustment is applied as needed based on the phase difference. The power transmitter 16 then adjusts the frequency of the power supplied to the off-transducer 18 to ensure the charging system power efficiency is maintained at a desired level. In one embodiment, the preferred charging system power efficiency is at least 85%. Preferably, the operational frequency range of the VFO circuit 24 is from about 15 kHz to 200 kHz.

Figure 4:
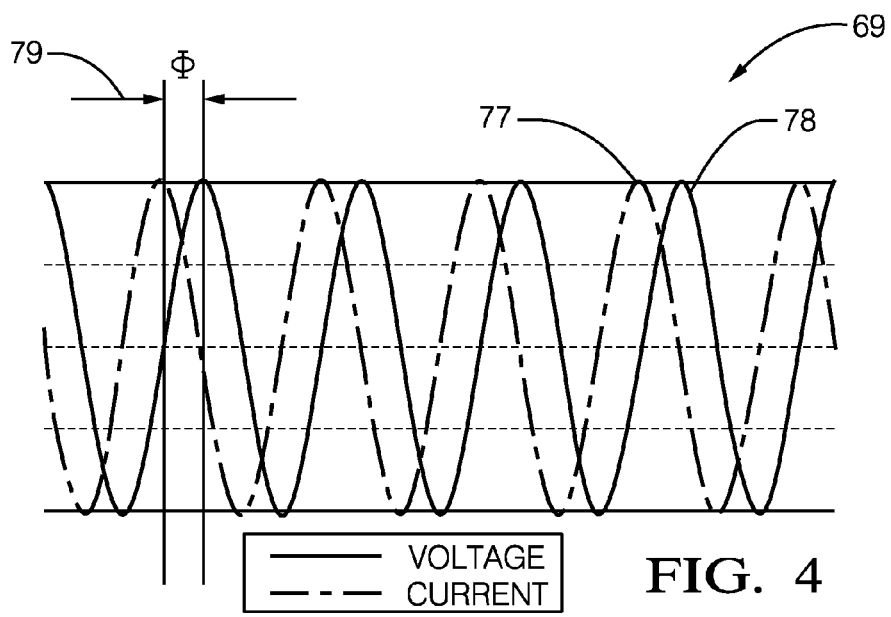
FIG. 4 shows an angular phase difference relationship between voltage and electrical current that is monitored by the VFO circuit of FIG. 3.

Referring now to FIG. 4, a graph 69 illustrates an example of an AC current flow measurement 77 and an AC voltage measurement 78 as a function of time in output 67*a*, 67*b* of VFO circuit 24 of power transmitter 16. AC current flow measurement 77 and AC voltage measurement 78 are sine waves that are out of phase by an amount represented by an angular phase difference or phase differential Φ designated here by reference number 79. For the resonant, i.e. loosely magnetically coupled, energy transfer between the off-transducer 18 and the on-vehicle transducer 20, the phase differential is preferably in a range from about 10 degrees to about 15 degrees and for inductive, i.e. closely coupled, energy transfer the phase differential is about 0 to 2 degrees to ensure optimum charging system power efficiency performance of the charging system 12. The phase difference takes into account the effects of part tolerances, temperature, and the alignment of the off-transducer 18 and the on-vehicle transducer 20.

Thus, the design of the charging system 12 including the VFO circuit 24 determines if the voltage and the current waveforms are within a predetermined phase difference range that ensures the charging system power efficiency delivered to the battery 14 is at an optimum level. The phase difference is analyzed by the charging system 12, more specifically by the controller in the VFO circuit 24 so that an optimum level of the charging system power efficiency is maintained. After analysis of the voltage and current waveforms input to the off-transducer 18, the controller outputs a voltage that is operable to adjust the frequency in the VCO 71 so the output signal of the power transmitter 16 to the off-transducer 18 maintains the desired charging system power efficiency. This also ensures the voltage and current phase difference is maintained at about 15 degrees for when the off-transducer 18 and the on-vehicle transducer 20 are loosely coupled and at zero (0) degrees when the off-transducer 18 and the on-vehicle transducer 20 are tightly coupled. Thus, the charging system 12 uses the angular phase difference value to determine if the transducers 18, 20 are loosely or tightly coupled.

The charging system 12 may further use voltage and current data from the controller/convertor 53 via the wireless link 65 to compare the power input to the off-transducer 18 to the power output by the on-vehicle transducer 20. The frequency of the VFO circuit 24 may be further adjusted to maximize the system power efficiency in addition or instead of adjusting the frequency to maintain a desired phase angle difference.

It should be noted that the angular phase difference values are predetermined to be in a predetermined range of values that correspond to a range of predetermined frequencies associated with the wireless transmission mechanisms (i.e. closely coupled or loosely coupled) as previously described herein. The charging system 12 may be configured to determine whether the transducers 18, 20 are closely or loosely coupled by sweeping the output frequency of the VFO circuit 24 through a wide range of frequencies e.g. from about 15 kHz to 200 kHz and then measuring the system power efficiency and phase difference as the output frequency is swept through the range. Based on system efficiency and phase difference measurements, the charging system 12 may be able to determine whether the transducers 18, 20 are closely or loosely coupled and set the operating frequency range and desired phase difference range accordingly.

Figure 5:
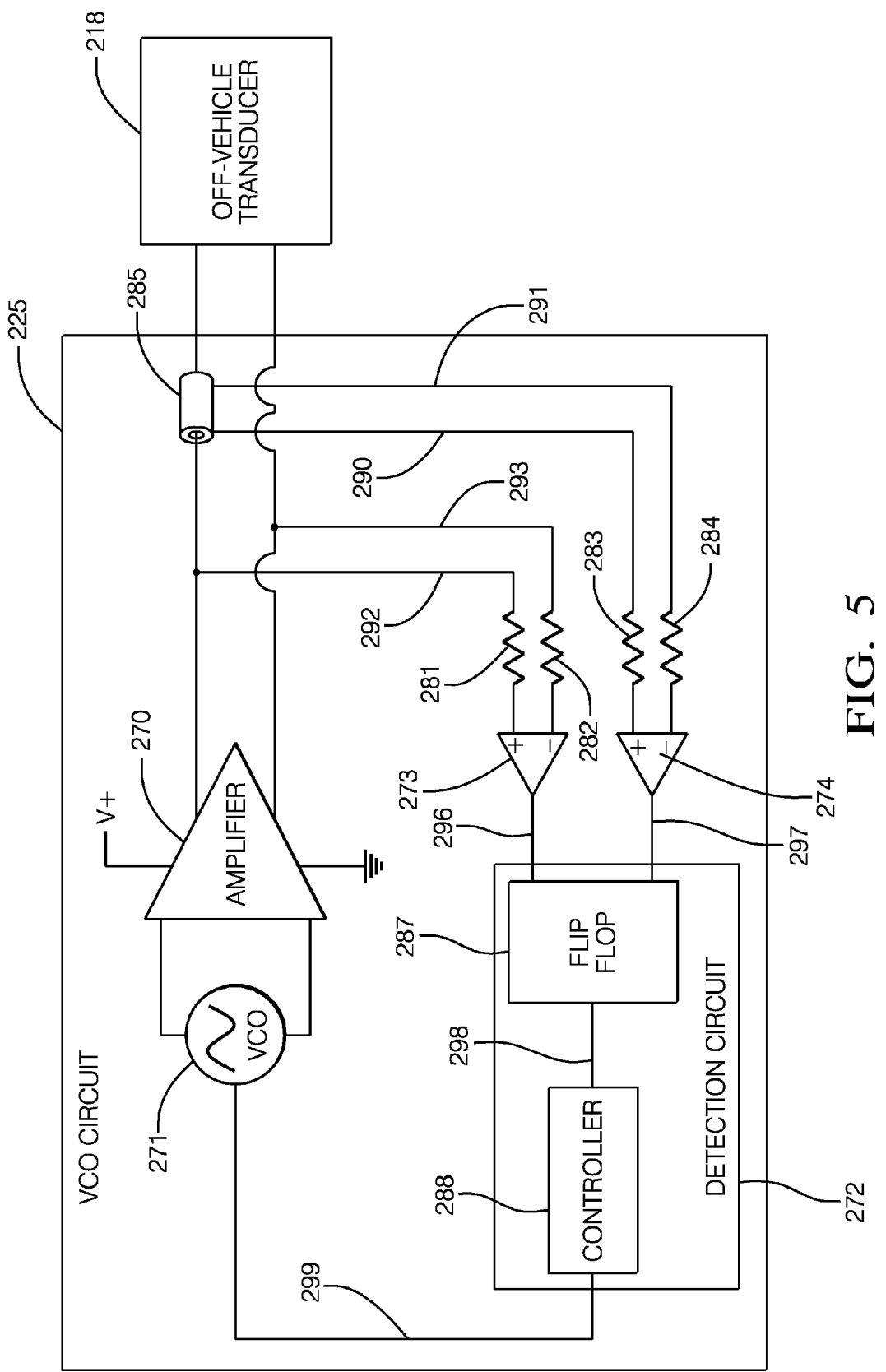
FIG. 5 shows a schematic diagram of a VFO circuit of a charging system according to an alternative embodiment of the invention.

Referring now to FIG. 5, an alternative VFO circuit 225 is illustrated. Elements similar to those shown in the VFO circuit 24 of FIG. 3 have reference numerals that differ by 200. Similar to the VFO circuit 24 as previously described, the VCO circuit 225 employs a voltage controlled oscillator (VCO) 271, an amplifier 270, a voltage monitor circuit 273, a current monitor circuit 274, and a phase detection circuit 272. The phase detection circuit 272 includes a flip-flop circuit 287 and a controller 288. The flip-flop circuit 287 provides a number of counts to the controller 288 that allows the controller 288 to determine the voltage provided on output 299 to control the frequency of VCO 271. Resistors 281-284, 289 allow the electrical signals to be biased at the correct voltage level. The current monitor circuit 274 is electrically connected to a sense coil 285 that provides a current measurement from an output of the amplifier 270. The VCO 271 is in electrical communication with inputs of amplifier 270. Voltage signals are carried on signal paths 292, 293 and received by the voltage monitor circuit 273. Current signals are carried on signal paths 290, 291 and received by the current monitor circuit 274. The flip-flop circuit 287 receives an output 296 from the voltage monitor circuit 273 and an output 297 from the current monitor circuit 274. An output 298 of the flip-flop circuit 287 is received by the controller 288. The VCO 271 receives an output 299 from controller 288. For example, if a zero electrical pulses are output from the flip flop to the controller 288 no adjustment in the frequency of the VCO 271 is necessary. If the number of pulses on the output of the flip flop is greater than zero pulses due to the feedback of the voltage monitor circuit 273 and the current monitor circuit 274, voltage adjustment to the VFO may occur that is in relation to the amount of the received feedback signal.

Alternatively, the phase detection circuit 72 of the VFO circuit 24 may comprise an embedded controller. Such a circuit implementation, for example, may eliminate other electrical blocks/electrical components in the VFO circuit 24 simplifying the circuit design providing a lower cost. Referring again to FIG. 3, using an embedded controller allows incorporated functionality so that the voltage monitor circuit 73, the current monitor circuit 74, the phase detection circuit 72, and the VCO 71 may not be needed. Similarly, referring to again FIG. 5, the voltage monitor circuit 273, the current monitor circuit 274, the flip-flop circuit 287, the controller 288 and the VCO 271 may not be needed when an embedded controller is used.

Returning now to FIG. 2, an enhanced charging system 12a that further includes an integrated charger 60 and transfer switch 57 is shown. The integrated charger 60 and the transfer switch 57 are disposed within the vehicle 40 and cooperate with the power transmitter 16, off-transducer 18, and on-vehicle transducer 20 to provide electrical current to electrically charge battery 14. The controller/convertor 53, integrated charger 60, and transfer switch 57 comprise electrical components that form an electrical signal shaping device 45.

A secondary charging system 62 (i.e. back-up charging system) may also electrically communicate with an integrated charger 60 disposed within the vehicle 40 to provide an electrical current to charge battery 14 when access to the wireless charging system 12 is not available. The secondary charging system 62 advantageously provides an alternative mode of charging the battery 14 for enhanced convenience.

The transfer switch 57 is operatively controlled by a controller portion of controller/convertor 53 via signal line 55 to switch between the secondary charging system 62 and the wireless charging system 12. An output 52 carries an electrical signal produced by on-vehicle transducer 20 that is received by a converter portion of controller/convertor 53. An output 56 carries an electrical signal from the converter portion of controller/convertor 53 that is received by transfer switch 57. An output 58 carries an electrical signal from transfer switch 57 to battery 14. A communication data bus 54, such as a controller area network (CAN) bus, communicates with the controller portion of controller/convertor 53 to receive/transmit either vehicle data information to enhanced charging system 12a or charging system data to other electric devices disposed within vehicle 40.

The wheels 51a, 51b, 51c, 51d of the vehicle 40 are used to assist alignment of the on-vehicle transducer 20 with off-transducer 18. An alignment means 99, such as a wheel chock 63 may further assist in this alignment of the off-transducer 18 and the on-vehicle transducer 20. Also, an alignment device 64, may also assist to position vehicle 40 so the off-transducer 18 and the on-vehicle transducer 20 are properly aligned. Alignment of the off- and on-vehicle transducers 18, 20 is needed to optimize energy transmission from the off-transducer 18 to the on-vehicle transducer 20. As shown in FIG. 2, alignment of the off-transducer 18 and the on-vehicle transducer 20 may occur when at least a portion of on-vehicle transducer 20 overlies off-transducer 18, as best illustrated in FIG. 2. Alternatively, alignment of the off-transducer 18 and the on-vehicle transducer 20 may occur when the off-transducer 18 and the on-vehicle transducer 20 are sufficiently spaced apart, but allow for wireless transmission of energy to occur therebetween such that the battery 14 of the vehicle 14 is electrically charged.

The secondary charging system 62 produces an output 61 that carries an electrical signal received by integrated charger 60 and this integrated charger 60 produces an output 59 that carries an electrical signal that is received by transfer switch 57.

Thus, a robust charging system 12 that adjusts the operating frequency of the charging system 12 to provide optimum charging system power efficiency has been presented. In addition, the charging system 12 may be configured to wirelessly transmit magnetic energy across a distance between a closely coupled or loosely coupled off-transducer 18 and on-vehicle transducer 20 pair. A VFO circuit 24 is used effectively manage the frequency of the electrical signal so that a phase difference between the voltage and current supplied to the off-transducer 18 is maintained in order to provide optimal charging system power efficiency.

The charging system is constructed of electrical components such as resistors, capacitors, relays, and the like, that are commonly commercially available in the electrical arts. The VCO 71 may be purchased as commonly available part at the frequencies of interest. The phase detection circuit 272 may be easily constructed with a flip-flop circuit 287 and a controller 288.

The charging system 12 may further determine the system power efficiency between the off-transducer 18 and the on-vehicle transducer 20 and make further adjustments to the operating frequency to provide optimal charging system power efficiency.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. An electrical charging system configured to wirelessly charge an energy storage device, said system comprising:
    an electrical power transmitter including a variable frequency oscillator configured to source electrical power having an alternating current, an alternating voltage, and a frequency;
    a controller operable to adjust the variable frequency oscillator, thereby changing the frequency of the sourced electrical power;
    an off-transducer in electrical communication with the electrical power transmitter, configured to be electromagnetically coupled to an on-vehicle transducer that is in electrical communication with said energy storage device, thereby inducing the on-vehicle transducer to capture electrical power to charge the energy storage device; and
    a phase detection circuit in communication with the controller and the off-transducer and configured to determine a phase difference between the alternating voltage and the alternating current, wherein the controller is configured to adjust the variable frequency oscillator based on the phase difference such that the frequency of the sourced electrical power maintains the phase difference within a desired range; and
    a wireless transmitter in electrical communication with the controller, wherein said on-vehicle transducer is in electrical communication with a power detection circuit configured to determine a value of the captured electrical power, wherein the power detection circuit is in electrical communication with a wireless receiver configured to wirelessly transmit the value of the captured electrical power to the controller via the wireless transmitter, and wherein the controller is configured to determine a power efficiency by comparing the value of the captured electrical power to the value of the sourced electrical power.

2. The system according to claim 1, wherein the controller is configured to adjust the variable frequency oscillator such that the frequency of the sourced electrical power sweeps within a frequency range of 10 kilohertz (kHz) to 450 kHz.

3. The system according to claim 1, wherein the controller is configured to adjust the variable frequency oscillator based on the power efficiency such that the frequency of the sourced electrical power maximizes the power efficiency.

4. The system according to claim 1, wherein the desired range of the phase difference is between 10 and 21 degrees.

5. The system according to claim 4, wherein the desired range of the phase difference is between 10 and 15 degrees.

6. The system according to claim 5, wherein the desired range of the phase difference is between 0 and 10 degrees.

7. The system according to claim 6, wherein the phase difference is about 0 degrees.

8. The system according to claim 1, wherein the on-vehicle transducer and the energy storage device are disposed within a vehicle.

9. The system according to claim 8, wherein the off-transducer and the electrical power transmitter are disposed external to the vehicle.

10. An electrical charging system configured to wirelessly charge an energy storage device, said system comprising:
    an electrical power transmitter including a variable frequency oscillator configured to source electrical power having an alternating current, an alternating voltage, and a frequency;
    a controller operable to adjust the variable frequency oscillator, thereby changing the frequency of the sourced electrical power;
    an off-transducer in electrical communication with the electrical power transmitter, configured to be electromagnetically coupled to an on-vehicle transducer that is in electrical communication with said energy storage device, thereby inducing the on-vehicle transducer to capture electrical power to charge the energy storage device; and
    a wireless transmitter in electrical communication with the controller, wherein said on-vehicle transducer is in electrical communication with a power detection circuit configured to determine a value of the captured electrical power, wherein the power detection circuit is in electrical communication with a wireless receiver configured to wirelessly transmit the value of the captured electrical power to the controller via the wireless transmitter, wherein the controller is configured to determine a power efficiency by comparing the value of the captured electrical power to the value of the sourced electrical power, and wherein the controller is configured to adjust the variable frequency oscillator based on the power efficiency such that the frequency of the sourced electrical power maximizes the power efficiency.

* * * * *